UNITED STATES PATENT OFFICE 1,983,971

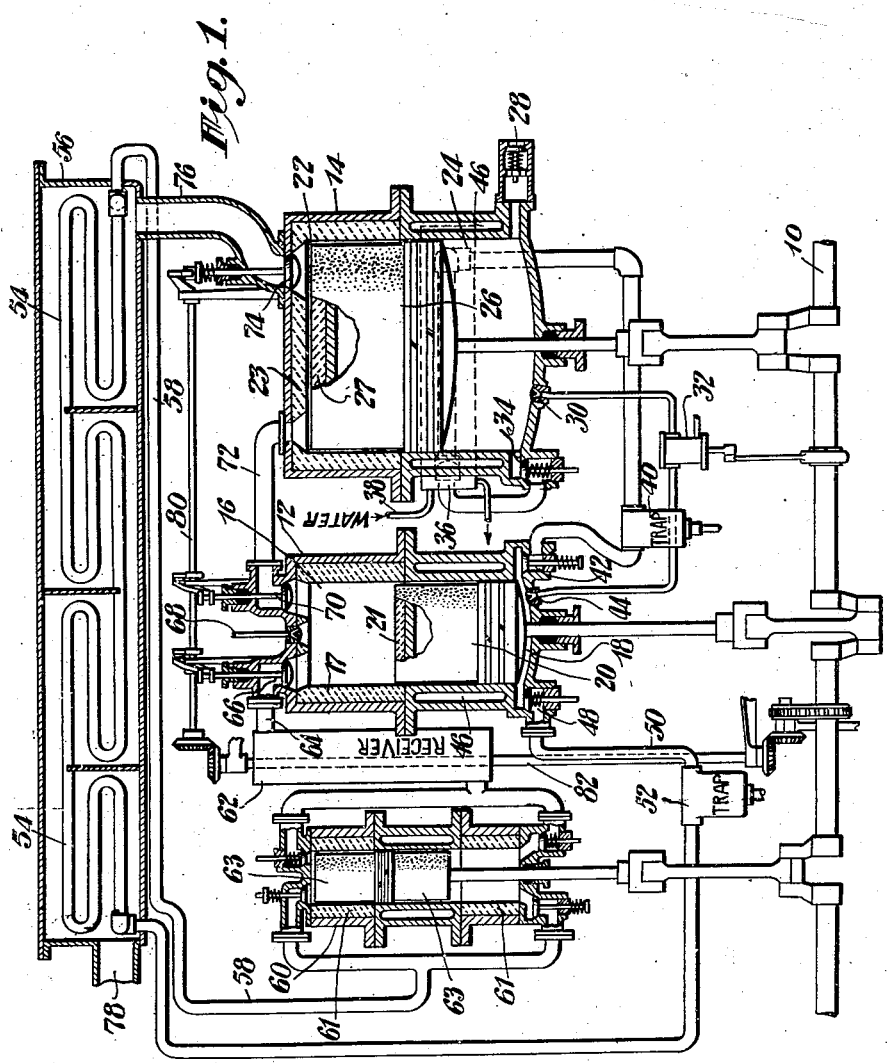

INTERNAL COMBUSTION ENGINE

Henry L. Doherty, New York, N. Y., assignor to Doherty Research Company, New York, N. Y., a corporation of Delaware Application October 26, 1927, Serial No. 228,716

6 Claims. (Cl. 123—32)

The present invention relates to internal combustion engines and more particularly to engines employing recuperators, the present application being a continuation in part of my prior application Serial No. 97,164, filed March 25, 1926, for Internal combustion engine and method of operating same.

It has been recognized widely that regenerator and recuperator cycles theoretically are very efficient. Many attempts have been made to realize some of the theoretical advantages of these cycles in practise, but no internal combustion engine employing either a recuperator or regenerator is now on the market, or in fact has ever been placed on the market. The regenerator in which the ingoing air flows through the same passages that have been heated by the exhaust gases is fatally defective in that it necessarily adds a large volume to the compression space of the combustion chamber. Additions to the compression space not only decrease the theoretical efficiency of the engine, but reduce its output per pound. The recuperator in which the air passing to the combustion chamber flows through different passages from those taken by the exhaust gases does not add to the clearance of the engine, but it has nevertheless not been used in practise. The difficulties in obtaining an internal combustion recuperator engine capable of competing with those of the ordinary Diesel and Otto types have been great, although the causes of the difficulties were obscure.

It has been found that a recuperator engine, in order to compete commercially with Otto or Diesel engines must satisfy a number of simultaneous conditions.

It has been recognized that a recuperator does not add to the commercial value of the Diesel or Otto type of engine in which the air for combustion is compressed in the combustion chamber. One of the conditions to be met by the recuperator engine is therefore that the air for combustion be compressed wholly or in part in a chamber or chambers separate from the combustion chamber. This, however, involves additional first cost and upkeep. In order that the recuperator shall justify itself commercially, it must return to the combustion chamber a sufficiently large percentage of the heat units not utilized by the engine to pay for the cost and upkeep and interest charges on both itself and the separate compressor means. In order to accomplish this result, it has been found that at least one of two ways must be used. One of the ways by which the recuperator may be made a profitable part of internal combustion engine apparatus is to cool the air strongly during compression and to take the compressed air to the recuperator without heating it. Cooling the air during compression, either in the compressing chambers or intermediate such chambers, or both, not only reduces the work of compression but increases the capacity of the air entering the recuperator to absorb heat and thereby increases the useful work obtainable from a given recuperator. Both cooling the air during compression and heating the air in the recuperator increases the overall efficiency in that they decrease the negative work done in compressing the air and reduce the waste heat in the exhaust gases. The second way in which the recuperator may be made commercially available is that of compressing the air adiabatically after it has passed through the recuperator and afterward expanding it through substantially a greater temperature range, the temperature at the end of said expansion being nearly as low as that at the beginning of said adiabatic compression. The reasons why this step of adiabatic compression after recuperation enhances the value of the recuperator is that it markedly increases the efficiency of the entire cycle. It will be understood that the strong cooling of the air during compressions prior to recuperation may be used in the same cycle with the adiabatic compression subsequent to recuperation.

After recuperation, the air must be conducted to the combustion chamber without cooling it and used in burning the fuel in the combustion chamber. The products of combustion must then be expanded to produce power. The expansion usually occurs in the combustion chamber but this is not essential. As above intimated, it is necessary that the expansion chamber be of the low clearance type, not over one-third the clearance employed in Otto or Diesel engines being preferred in the recuperator engine assuming equal compression in the two cases. The compression of the air in a chamber separate from the combustion chamber fortunately permits the combustion chamber to be made substantially without clearance space. Moreover, in order that there be sufficient heat units in the exhaust and on which the recuperator can operate to make the recuperator worth while, but without undue use of fuel in the combustion chamber, the combustion chamber must be heat insulated. Experiment has shown, that heat insulation in the cylinders of Otto and Diesel engines reduces the capacity to such an extent that, not only is there no commercial advantage, but that the over-all efficiency of the engine is decreased. This has been found to be the case as to Otto and Diesel engines in spite of the increase in the theoretical cycle efficiency caused by heat insulation. In the recuperator engine in which the air is compressed externally of the combustion chamber, however, expansion of the air in the recuperator can be readily made use of to maintain the pressure on the piston during a part of the engine stroke and thereby becomes an advantage rather than the opposite. It is essential to use heat insulation on the inner face of the cylinder including the cylinder head or the head of the expansion chamber or chambers in the cylinder. If the combustion occurs in a chamber outside the expansion cylinder, the combustion chamber must also be heat insulated. It is greatly preferred also to use heat insulating material on that part of the surface of the piston exposed to the combustion.

Another factor essential to the successful use of the recuperator engines has been found to be that the recuperator be of the counterflow type.

In engines of moderate sizes, moreover, an important practical consideration has been found to reside in the use of the chamber in one end of the cylinder for compression while the chamber in the other end of the cylinder is used for combustion. This arrangement permits an engine of moderate size to combine the high heat efficiency of the recuperator design with a satisfactory output per pound of weight. It is desirable, however, that the full capacity of the cylinder be used for compressing purposes at the compression end of the cylinder; otherwise, the output of a given engine cylinder is reduced considerably. In compound engines, this applies particularly to the low pressure cylinder.

It is the principal object of the present invention to provide a design for a recuperator engine which shall overcome defects of the prior recuperator engines and which shall comply with the requirements as set out above.

Further objects and advantages of the present invention will be apparent to those skilled in the art from the following description taken in connection with the accompanying drawing, in which:—

Fig. 1 is an elevation partly diagrammatic in character of an engine according to the present invention, parts being shown in section and parts being broken away for purposes of illustration.

Fig. 2 is a temperature-entropy diagram illustrating a preferred temperature-entropy cycle for the operation of the engine illustrated in Fig. 1.

In the drawing, 10 is the main shaft of an engine, the engine having a combustion cylinder 12 and a low pressure expansion cylinder 14. Cylinder 12 is divided into a joint reaction or combustion and expansion chamber 16 and compression chamber 18 by the piston 20. As illustrated, cylinder 12 is of the low clearance type and has a heat insulating lining 17 on the curved walls and head of chamber 16, while piston 20 has a heat insulating covering 21 on its face toward chamber 16. Cylinder 14 is divided into an expansion chamber 22 and a compression chamber 24, by the piston 26. Cylinder 14 and piston 26 also have heat insulating covering and lining 23 and 27 respectively. Low pressure air, either from the atmosphere or from a super-charger is taken into chamber 24 through a valve 28 and receives a first stage of pistoned compression in this chamber. Air undergoing compression in chamber 24 preferably is cooled strongly, isothermal compression being desirable in many cases. A water spray introduced into chamber 24 at 30 and coming from pump 32 is a suitable cooling means for this purpose. As piston 26 approaches the crank end of the cylinder 14, the air is forced out of chamber 24 through valve 34. In the apparatus as illustrated, the air then enters an inter-cooler 36 which may consist of a pipe coil over which water is led from the source 38. The air from inter-cooler 36 passes into the compression space 18 of the cylinder 12. It is preferred, however, that a trap 40 be connected in the air line between chamber 24 and chamber 18 to remove water and moisture from the air. Air enters chamber 18 through an inlet valve 42. In the chamber 18 the air undergoes a second stage of pistoned compression and is preferably further cooled strongly during this stage of compression by a water spray introduced into cylinder 12 at 44, or by other suitable means. It will be observed that both cylinders 14 and 12 are water jacketed as indicated at 46, 46 throughout the portions of the cylinders in contact with the piston rings of the pistons 20 and 26. The air compressed in chamber 18 is discharged therefrom through valve 48 into pipe 50. Pipe 50 preferably contains a trap 52 to remove water and moisture from the air. The pipe 50 delivers air to the heating coils 54, 54 of the recuperator 56 in which the air is heated by exhaust gases. Any moisture or water in the air at the time it enters coils 54 is converted into steam while passing through coils 54 of the recuperator. Air leaving recuperator or heating coils 54 enters the pipe 58 and is thereupon conducted to a compressor cylinder 60. Preferably the cylinder 60 is double acting as shown and in it the air is given a final stage of compression. The compression in cylinder 60 is adiabatic, the compression spaces of cylinder 60 having heat insulation linings 61, 61 and the piston working in cylinder 60 has insulating extensions 63, 63, linings 61 and extensions 63 causing the compression in cylinder 60 to be adiabatic. Unless the compression of the air at the point in the cycle between the recuperator 56 and the combustion chamber 16 is carried out in heat insulated chambers such as those illustrated as used in compressor cylinder 60, the loss of heat is very great. The temperature and pressure of the air when entering cylinder 60 are both so high that a water cooled compression chamber in cylinder 60 would act almost as an isothermal compressor. Air leaving cylinder 60 enters a receiver 62 and passes thence through pipe 64 to an intake valve 66. Air passes through the valve 66 into reaction or combustion chamber 16. The connections between cylinder 60 and chamber 16 are insulated to prevent loss of heat and pressure. Due to heating in the recuperator 56 and during the adiabatic compression in cylinder 60 air enters chamber 16 at a temperature insuring the ignition of the fuel used without assistance from ignition apparatus and no ignition apparatus is used or illustrated. The ignition of the fuel is, however, assisted by the lining 17 and covering 21 which become highly heated on their exposed surfaces. Fuel is introduced into chamber 16 through pipe 68 and is burned in the chamber 16 with the heated highly compressed air supplied as previously described. After partial expansion in the chamber 16 with production of power, the products of combustion are discharged by valve 70, and transferred through passage 72 into chamber 22 of cylinder 14. Preferably, the transfer passage 72 has as small a volume as possible, the showing of the passage in the drawing being diagrammatic. After further expansion with production of power in the chamber 22 the exhaust gases are discharged through the valve 74 into a conduit 76 by which they are carried into the casing of the recuperator 56. In the recuperator 56 the exhaust gases pass counterflow to the air passing through the coils 54. The exhaust gases are finally discharge from the recuperator 56 at a temperature very little higher than that of the air at the point at which the compressed air enters the recuperator. The exhaust gases are discharged from the recuperator at point 78.

The valves for controlling the flow of air into and out of the combustion chamber 16 and the expansion chamber 22 are mechanically operated. As illustrated, these valves are operated from the cam shaft 80, shaft 80 being driven in turn by a shaft 82 geared to the shaft 10. Cam mechanisms for operating valves of internal combustion engines are well known and any one of a variety of types may be employed in engines according to the present invention. The mechanism for operating valves 66, 70 and 74 will accordingly not be described in detail. As illustrated, the valves controlling the flow of air into and out of chambers 24, and 18 and cylinders 60 are automatic in operation, being held normally closed by means of springs and opened when the pressure in the direction away from their seats overcomes the spring pressure. I do not limit myself however to the use of automatic valves in the compression of the air.

The means for forcing liquid fuel at suitable pressure into the fuel pipe 68 and the means for governing the engine to prevent undue variations of speed with variations of load, both are not illustrated herein. Means for supplying fuel to engines and for controlling the speed are both well known in the art and any suitable mechanism for such purposes may be employed in connection with the present invention. These mechanisms therefore are not illustrated herein.

The combustion chamber 16 of cylinder 12 is provided on the inner face of its side walls and on the inner face of its head with a heat insulating lining 17. Similarly the piston 20 is provided with an extension on the face toward the chamber 16 and said extension is provided with a heat insulating covering 21. The lining 17 and covering 21 not only prevent the loss of heat from the engine cycle and thereby increase the efficiency of the engine but assist in igniting the fuel. The lining 17 and covering 21 are preferably of bonded zircon. Suitable methods of bonding zircon are known and include bonding it by small amounts of phosphoric acid, of precipitated iron or zirconium hydroxide, or of precipitated barium or calcium carbonate. The hydroxide or carbonate should be precipitated in situ and the soluble salt formed at the time the bond is precipitated should be washed out of the mixture of aggregate and bond before firing. The above methods of bonding zircon form no part of the present invention, however, and are not claimed herein.

Preferably also the expansion chamber 22 in cylinder 14 is supplied with an insulating lining 23 and the piston 26 has a corresponding extension provided with an insulating cover 27.

It will be seen that the engine disclosed herein contains the elements disclosed in a prior application Ser. No. 97,164 by Henry L. Doherty, filed March 25, 1926. The engine according to the present application, however, as compared to said prior application, includes means for giving the air an additional stage of compression prior to the use of the air in the combustion chamber and more particularly an adiabatic compression stage intermediate the step of recuperation and that of combustion. The purpose of a stage of adiabatic compression after recuperation is more fully explained hereinbelow in connection with the cycle whose temperature entropy diagram is illustrated herein in Fig. 2 and which is disclosed also in said application, Ser. No. 97,164.

In the operation of the engine previously described, the air is cooled strongly during compression and prior to its passage through the recuperator. It is preferred that the cooling of the air prior to the recuperation be as nearly isothermal as practicable. In the temperature-entropy diagram illustrated in Fig. 2, the strongly cooled compression of the air as just mentioned is indicated by an isothermal line beginning at point 84 and running to the point 86. After the strongly cooled compression the air enters the recuperator and passes therethrough with resulting increase in both its temperature and entropy as indicated in the curve running from point 86 to point 88. After passing through the recuperator, the air receives an adiabatic compression as indicated by the isentropic line extending from point 88 to point 90. After the adiabatic compression, the air is burned with fuel with consequent rapid increase in temperature and some increase in entropy as indicated by the curve extending from point 90 in Fig. 2 to point 92. At point 92 in the diagram the temperature has reached a zone in which the dissociation of products of combustion is approached, and further combustion occurs substantially at this temperature as indicated by a line almost parallel to the entropy axis and extending on the diagram from point 92 to point 94. The fuel having been completely consumed, adiabatic expansion thereupon takes place as indicated by the isentropic line extending from point 94 to point 96. It is clear from the diagram of Fig. 2 that the adiabatic expansion of the products of combustion passes substantially through the same temperature range as the diabatic compression which occurred in the cycle just subsequent to the recuperative heating of air and which is indicated on the diagram by the line 88—90. In other words, gases at point 96 of Fig. 2 are substantially at the same temperature as at point 88. After adiabatic expansion, the products of combustion pass through the recuperator and undergo changes of temperature and entropy as indicated by the line 96—84, thus closing the cycle. As to the cycle illustrated in Fig. 2, particular emphasis is laid upon the adiabatic compression intermediate the recuperative heating of the air and its heating by combustion. This compression after recuperation is resorted to primarily,—

1. To insure that the temperature of the gases entering the combustion chamber are hot enough to promote efficient combustion 2. To increase the efficiency of the engine 3. To increase the power capacity of the engine 4. To cause the entropy diagram to more nearly approach the ideal Carnot cycle.

Owing to the general limitation which is placed upon the temperatures attained during combustion by dissociation, the attainment of the objects enumerated is attended by an accentuation of the approach to isothermal, which is usually present to some extent in commercial engines, as against adiabatic expansion.

As is also well known, the efficiency of an engine is measured by the average temperature of the net heat addition divided into the difference between the average temperature of the net addition and the average temperature of the net heat abstraction. Adiabatic compression at the point in the cycle intermediate recuperation and combustion increases the thermal efficiency in that it makes the air temperature at the beginning of combustion as high as possible and thereby increases the average temperature of heat addition which occurs during the cycle. The adiabatic compression after recuperation increases the power capacity of the engine by increasing the mean effective pressure acting during the power stroke. Furthermore, the adiabatic compression at the point of the cycle under consideration renders the sides of the temperature entropy diagram more nearly parallel. It is a principle which has been recognized that any cycle in whose temperature-entropy diagram the lines representing the temperature increases are parallel to lines representing temperature decreases may be transformed into an equivalent Carnot cycle. Since the Carnot cycle is the theoretical cycle having maximum efficiency, it is clear from the diagram of Fig. 2 that the step of adiabatic compression of air intermediate the recuperation and the combustion as represented by a line parallel to the subsequent adiabatic expansion, adds to the efficiency of the cycle for this reason also. However, in order to take full advantage in engines of the opportunities afforded by the adiabatic compression of air after recuperation, it has been found that it is necessary that the subsequent adiabatic expansion of products of combustion should be carried to a point such that the temperature at the end of the adiabatic expansion is approximately equal to that at which the adiabatic compression of air began. In other words, the adiabatic expansion should preferably extend through substantially the same temperature range as that of the adiabatic compression, as illustrated in Fig. 2. It has been found that when adiabatic compression after recuperation is coupled with adiabatic expansion after combustion through substantially the same temperature as the compression, the cycle efficiency is so high that the cooling of the air in the compression before recuperation may sometimes be omitted and still obtain a commercial engine for certain purposes.

It will be observed that the entropy range between any two points of equal temperature on the recuperation curves 86—88 and 96—84 respectively, is the same as the entropy range caused by the combustion of the fuel. It has been found by comparing numerous diagrams that the equality of entropy ranges just mentioned produces a cycle which, other things being equal, has a maximum efficiency. This broad principle, however, is claimed in said prior application Serial No. 97,164 and is claimed herein only in connection with a cycle having an adiabatic compression step following recuperation.

The present invention has been described above in connection with a specific apparatus. It will be understood that I do not limit myself to details of construction, arrangement or operation as set out above except insofar as such details are plainly included in the following claims, it being intended to claim the invention as broadly as permitted by the prior art.

Having thus described my invention, I claim:

1. In an internal combustion engine, the combination of a combustion chamber having a heat insulating lining, a counter flow recuperator connected to receive hot gases from said combustion chamber, means for cooling air compressed in said compression chamber and for delivering cool compressed air to said recuperator, a second compression chamber, means for delivering hot compressed air from said recuperator to said second compression chamber, means for compressing the air further in said second compression chamber and at substantially constant entropy, and connections for delivering air from said second compression chamber to said combustion chamber at substantially the same temperature and pressure at which it leaves said second compression chamber.

2. In an internal combustion engine, the combination of means for compressing air, a recuperator, connections for passing air from said compressing means through said recuperator and counter flow to hot gases of combustion, means whereby air which has passed through said recuperator is given a second and adiabatic stage of compression, a low clearance combustion chamber, means for conducting air from said second compression means to said combustion chamber and for burning fuel therewith in said combustion chamber, means whereby the products of combustion are expanded adiabatically under insulated conditions and to a temperature approximately equal to that of the air at the beginning of said adiabatic compression, and connections whereby the expanded products of combustion are conducted to said recuperator.

3. In an internal combustion engine, means for compressing and for cooling air, a recuperator, means whereby cooled compressed air from said means is heated in said recuperator by passing therethrough counter-flow to hot products of combustion, means whereby air heated in said recuperator is given a second and adiababatic stage of compression, a low clearance heat insulated expansion chamber, means whereby air compressed in said second compressing means is heated by uniting with fuel in said combustion chamber, means whereby products of combustion formed in said combustion chamber are expanded adiabatically and to a temperature approximately equal to that of the air at the beginning of said adiabatic compression, and connections whereby products of combustion are passed through said recuperator.

4. In an internal combustion engine, means for compressing air, a recuperator, means whereby air from said compressing means is heated in said recuperator by passing counter-current to products of combustion, means for compressing adiabatically air which has been heated in said recuperator, a low clearance heat insulated combustion chamber, means for combining air which has been compressed in said second compressing means with fuel in said combustion chamber and means whereby products of combustion are expanded and passed through said recuperator.

5. In an internal combustion engine, means for compressing air, a recuperator, means for heating the air from said means by passing it through said recuperator counter-flow to products of combustion, means for giving air from said recuperator a second and adiabatic stage of compression, a low clearance heat insulated combustion chamber, means for combining air from said second compressing means with fuel in said combustion chamber, means whereby products of combustion are expanded adiabatically under heat insulating conditions to a temperature approximately equal to the temperature of the air at the beginning of said second stage of compression, and connections for leading expanded products of combustion to said recuperator.

6. In an internal combustion engine, means for compressing air and for cooling it, a recuperator, means for heating air from said means while passing through said recuperator counter-current to products of combustion, means for compressing air from said recuperator in a second and adiabatic stage of compression, a low clearance heat insulated combustion chamber, means for combining air with fuel in said combustion chamber, means whereby products of combustion from said chamber are expanded adiabatically while heat insulated, and connections whereby products of combustion pass to said recuperator.

HENRY L. DOHERTY.